United States Patent [19]

Mouri

[11] Patent Number: 5,317,513
[45] Date of Patent: May 31, 1994

[54] APPARATUS FOR ACTIVELY CONTROLLING STEER ANGLE OF FRONT WHEELS OF VEHICLE

[75] Inventor: Hiroshi Mouri, Yokosuka, Japan

[73] Assignee: Nissan Motor Co., Ltd., Yokohama, Japan

[21] Appl. No.: 750,948

[22] Filed: Aug. 28, 1991

[30] Foreign Application Priority Data

Aug. 28, 1990 [JP] Japan ................................ 2-224245

[51] Int. Cl.$^5$ .............................................. B62D 5/00
[52] U.S. Cl. ............................. 364/424.05; 180/79.1; 180/142
[58] Field of Search ..................... 364/424.05; 280/91; 180/79.1, 140–143

[56] References Cited

U.S. PATENT DOCUMENTS

| | | | |
|---|---|---|---|
| 4,527,654 | 7/1985 | Shibahata et al. | 180/143 |
| 4,666,013 | 5/1987 | Shibahata et al. | 180/142 |
| 4,773,012 | 9/1988 | Ito et al. | 180/142 |
| 4,828,061 | 5/1989 | Kimbrough et al. | 180/142 |
| 4,842,089 | 6/1989 | Kimbrough et al. | 180/142 |
| 4,951,207 | 8/1990 | Furukawa et al. | 180/142 |
| 5,029,660 | 7/1991 | Raad et al. | 364/424.05 |
| 5,151,860 | 9/1992 | Taniguchi et al. | 180/79.1 |

*Primary Examiner*—Gary Chin
*Attorney, Agent, or Firm*—Foley & Lardner

[57] ABSTRACT

In an apparatus for actively controlling a steer angle of front wheels of a vehicle, a steering angle of a steering wheel is detected and then an active control amount for actively controlling the steer angle of the front wheels including a proportional term and a differential term is calculated. After only the differential term has been delayed, the steer angle of the front wheels is controlled in accordance with the active control amount. Since the differential component in the active control amount has been delayed, the steer angle of the front wheels is changed gradually, so that the variation in the steering force is suppressed. Therefore, the maneuverability and operating properties of the vehicle can be improved.

5 Claims, 4 Drawing Sheets

FIG_1
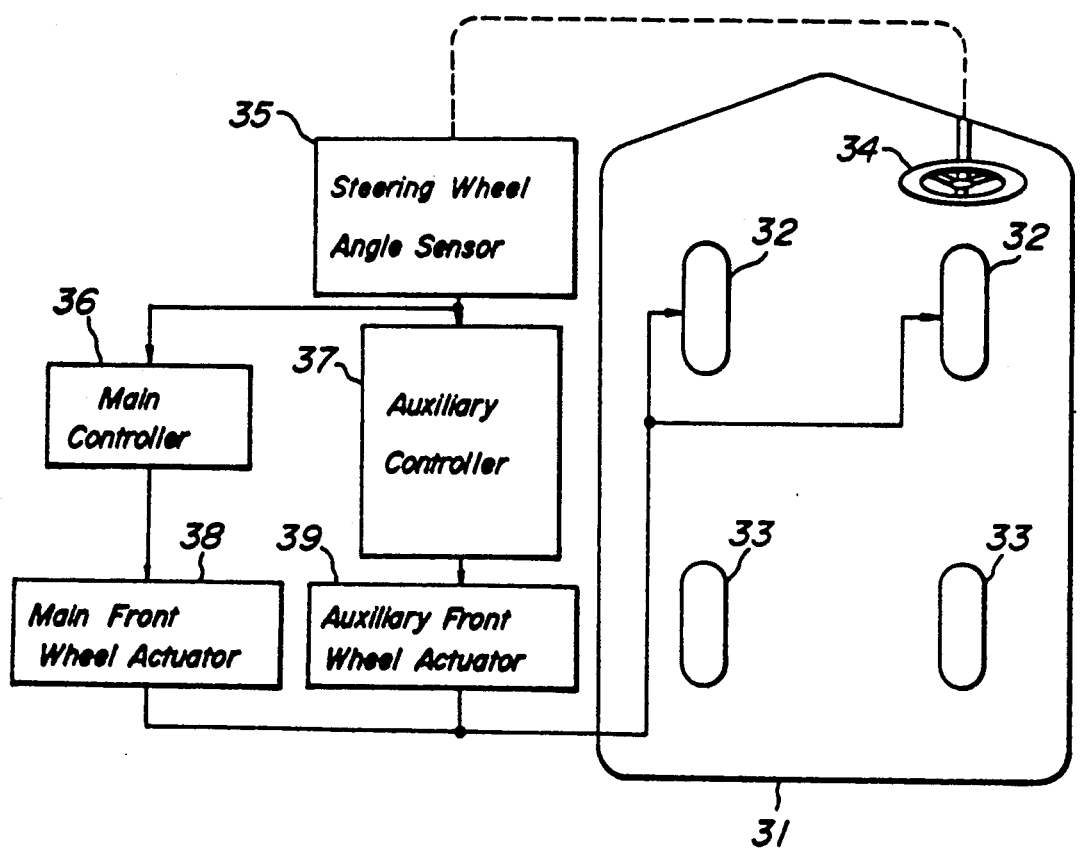

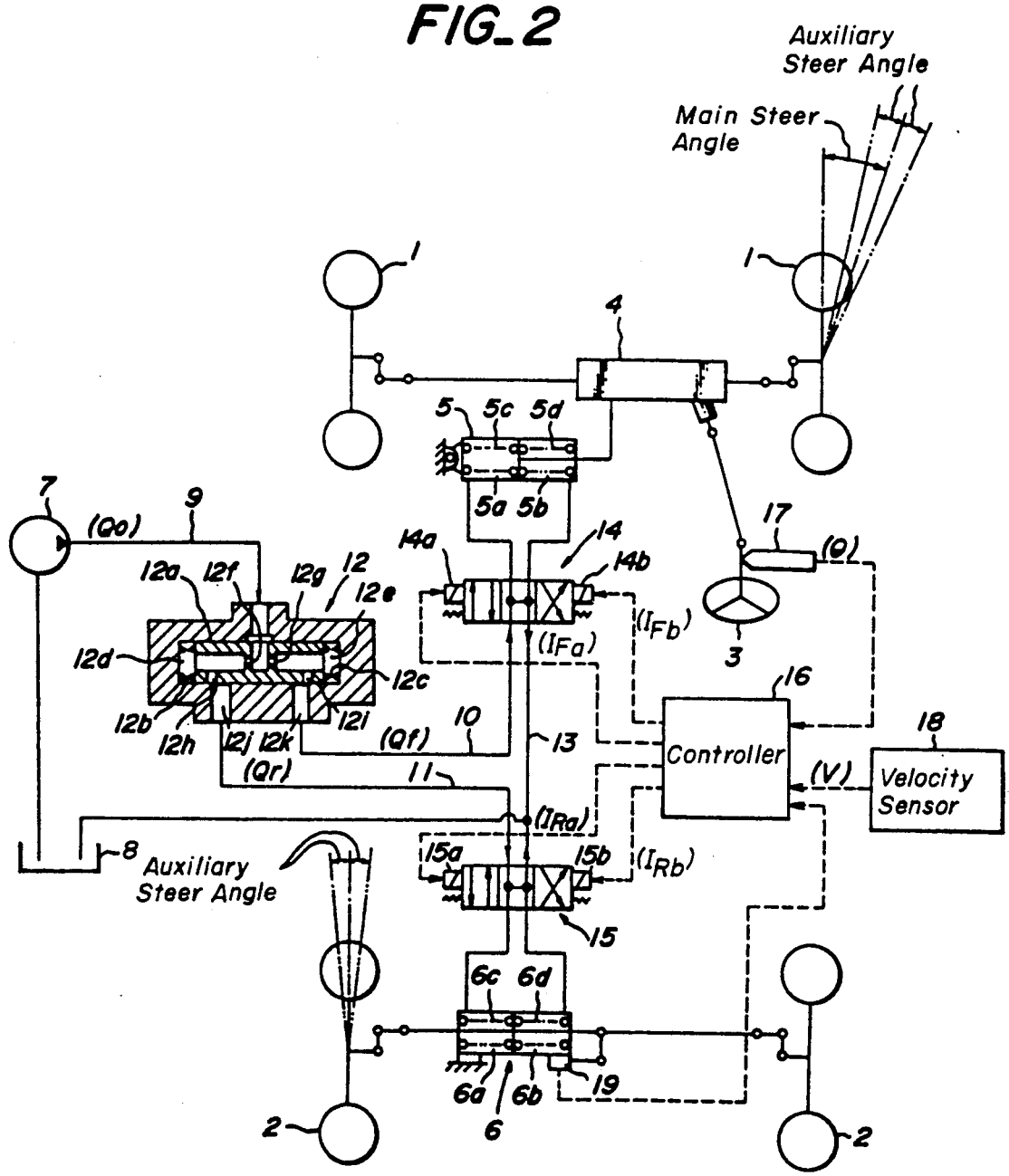

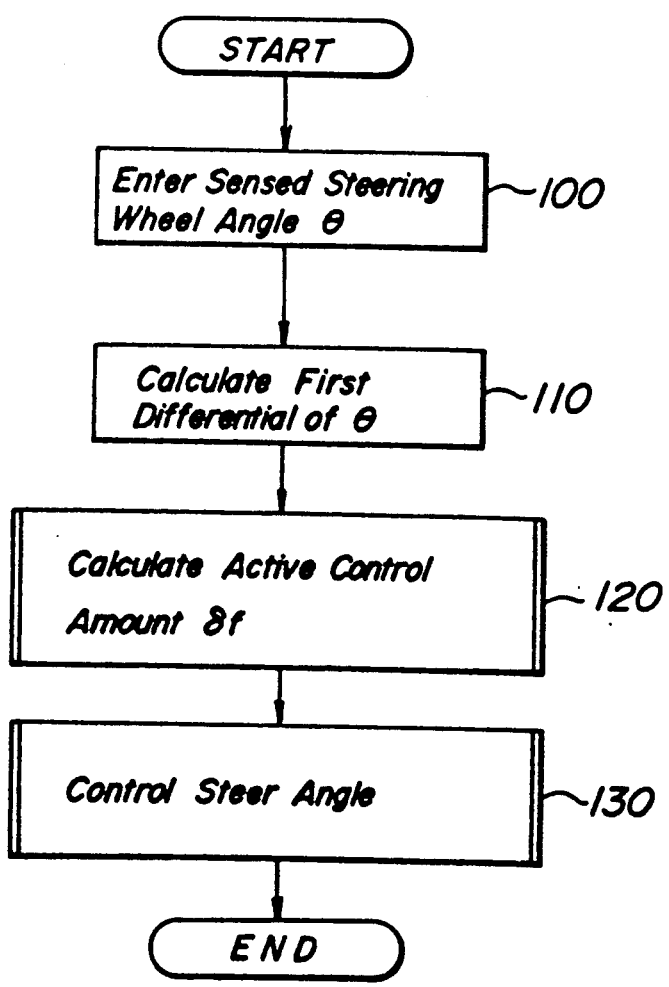

APPARATUS FOR ACTIVELY CONTROLLING STEER ANGLE OF FRONT WHEELS OF VEHICLE

BACKGROUND OF THE INVENTION

Field of the Invention and Related Art Statement

The present invention relates to an apparatus for controlling a steer angle of front wheels of a vehicle, and more particularly to an apparatus for effecting an active control in which a steer angle of the front wheels is increased actively in accordance with a steering wheel angle.

There has been proposed an apparatus for actively controlling a steer angle of front wheels of a vehicle, in which, in addition to a usual control of the front wheels in proportion to a steering wheel angle, the steer angle of the front wheels is auxiliarily controlled in an active manner. There has been also proposed an apparatus for auxiliarily controlling both the front wheels and the rear wheels in an active manner. The latter apparatus is utilized in a so-called four wheel steering (4WS) vehicle. For instance, in Japanese Patent Publication Kokai Sho No. 60-161,266, the above mentioned steer angle controlling apparatus is described.

In the known apparatus for actively controlling the steer angle of front wheels, an active control amount for auxiliarily or actively controlling the steer angle of the front wheels is calculated in accordance with a steering wheel angle and a running velocity of the vehicle, and the steer angle of the front wheels is additionally increased by the thus calculated active control amount. This improves the stability and handling properties of the vehicle. For instance, when the steer angle of the front wheels is increased by the active control amount, upon a turn of the vehicle, a head-turning characteristic of the vehicle can be improved due to an increase in a yaw rate, i.e. an angular velocity of a yawing movement of a body of the vehicle.

In the known apparatus for controlling the steer angle of the front wheels in the active manner, the active control amount is derived by effecting calculations based on a steering wheel angle and an angular velocity of the steering wheel angle. Therefore, although the steering wheel angle is the same, a sideslip angle of the front wheels might be changed in dependence upon the angular velocity of the steering wheel angle. That is to say, the sideslip angle of the front wheels is increased in relation to a differential in time of the steering wheel angle. This results in that at an initiation of steering wheel operation by a driver, a force necessary for manipulating the steering wheel, i.e., a so-called steering force, is increased very abruptly, so that the steering force shows a large variation as illustrated by a curve A in FIG. 4C. Therefore, the known apparatuses for actively controlling the steer angle of the front wheels could not achieve optimum stability and maneuverability.

SUMMARY OF THE INVENTION

The present invention has for its object to provide a novel and useful apparatus for controlling the steer angle of the front wheels of the vehicle in an active manner, in which the variation of the steering force for operating the steering wheel can be suppressed to improve the maneuverability and handling properties, while the merit of the active control can be remained.

According to the invention, an apparatus for controlling a steer angle of front wheels of a vehicle comprises:

sensing means for detecting a steering wheel angle to produce a steering wheel angle signal;

signal processing means for processing said steering wheel angle signal to derive an active control amount including at least a delayed first order differential of said steering wheel angle signal;

actuating means for steering the front wheels in accordance with said steering wheel angle signal as well as said active control amount.

According to the invention, by delaying at least the first order differential of the steering wheel angle signal, the variation in the steering force for manipulating the steering wheel including the initial abrupt change can be suppressed to a large extent, so that the feeling of operating the steering wheel can be resembled to that which is obtained upon driving a vehicle without the active control of the steer angle of the front wheels, while the merits of the active control of the steer angle of the front wheels can be still obtained.

BRIEF DESCRIPTION OF THE DRAWINGS

FIG. 1 is a schematic view showing the principal construction of the apparatus for actively controlling the steer angle of the front wheels according to the invention;

FIG. 2 is a schematic view illustrating an embodiment of the steer angle active control apparatus according to the invention;

FIG. 3 is a flow chart representing the operation of the apparatus shown in FIG. 2.

DESCRIPTION OF THE PREFERRED EMBODIMENTS

Figure 4A:
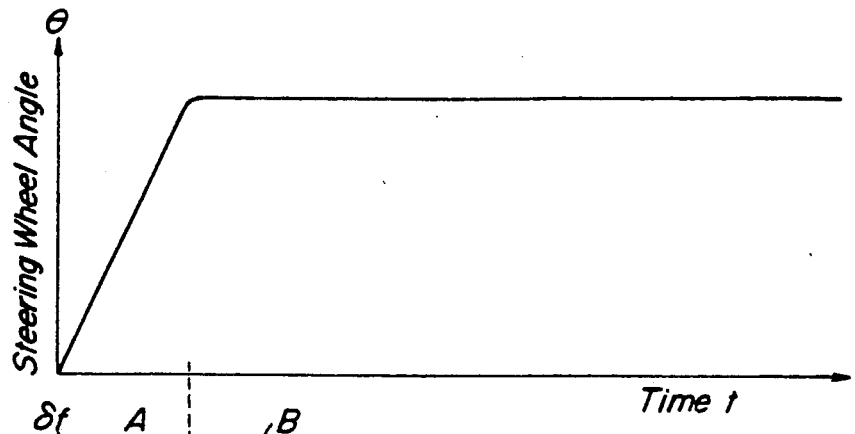
FIGS. 4A to 4D are graphs depicting the function of the apparatus according to the invention in comparison with the known apparatus.

FIG. 1 is a schematic view showing the principal construction of the apparatus for actively controlling a steer angle of front wheels of a vehicle according to the invention. A vehicle 31 is illustrated symbolically as having front wheels 32, rear wheels 33 and steering wheel 34. A steering wheel angle is detected by a steer angle sensor 35 and a steering wheel angle signal is parallelly supplied to a main controller 36 and an auxiliary controller 37. In the main controller 36, the steering wheel angle signal is processed in a usual manner to derive a main steer angle control signal, which is then supplied to a main front wheel actuator 38. In the auxiliary controller 37, an active control amount including at least a first order differential in time of the steering wheel angle signal is derived, and then only the differential component in the active control amount is delayed by a suitable time to produce an auxiliary steer angle control signal. This auxiliary steer angle control signal is supplied to an auxiliary front wheel actuator 39. In this manner, the steer angle of the front wheels 32 is controlled by both the main actuator 38 and the auxiliary actuator 39. According to the invention, the auxiliary steer angle control signal is obtained by delaying the differential of the steering wheel angle signal, so that the steer angle of the front wheels 32 is changed gradually and thus the variation of the steering force can be suppressed. It should be noted that according to the invention, in addition to the first order differential of the steering wheel angle signal, one or more higher order differentials such as second and third order differentials may be also delayed. In an embodiment which will be explained hereinafter, only the first order differential of the steering wheel angle signal is delayed.

FIG. 2 is a schematic view illustrating an embodiment of the steer angle active control apparatus according to the invention. Reference numerals 1 and 2 denote front wheels and rear wheels, respectively. The front wheels 1 can be steered by transferring a steering input applied to a steering wheel 3 to the front wheels 1 via a steering gear 4 so as to perform a usual main steering control. In order to perform the auxiliary steer angle control for the front wheels 1, a housing of the steering gear 4 is linearly moved by an actuator 5 of an auxiliary steer angle control apparatus. The front wheels 1 can be steered auxiliarily by the auxiliary steer angle control up to the maximum steer angle $\alpha$. In this embodiment, the steer angle of the rear wheels 2 is also controlled actively. That is to say, the steer angle of the rear wheels 2 can be actively controlled up to the maximum angle $\beta$ by means of an actuator 6 provided in a rear wheel steering apparatus. In the present embodiment, it is assumed that $\alpha > \beta$.

The apparatuses for controlling the steer angles of the front and rear wheels comprise, in addition to the respective actuators 5 and 6, a common pressure source formed by an oil pump 7, distributing valve 12 and steer angle controlling valves 14 and 15. The oil pump 7 sucks an oil in a reservoir tank 8 and discharges the sucked oil into a main circuit 9. The oil discharged into the main circuit 9 is delivered by the distributing valve 12 into a front wheel steer angle auxiliarily controlling circuit 10 and a rear wheel steer angle auxiliarily controlling circuit 11.

In the distributing valve 12, a shuttle spool 12a is resiliently supported into a neutral position by means of springs 12b and 12c and pressure chambers 12d and 12e are formed on both sides of the shuttle spool. These pressure chambers 12d and 12e are communicated with the main circuit 9 by means of orifices 12f and 12g, respectively which have different diameters and are formed in the shuttle spool 12a. The pressure chambers 12d and 12e are further communicated with rear and front wheel steer angle auxiliarily controlling circuits 11 and 10 by means of openings 12h and 12i, respectively formed in the shuttle spool and output ports 12j and 12k, respectively formed in a holding of the distributing valve 12. When the shuttle spool 12a is moved in accordance with a pressure difference between the pressure chambers 12d and 12e, the communication degrees between the openings 12h and 12i and the output ports 12j and 12k, respectively are changed in opposite senses to perform the adjustable distribution of the oil.

Now a required flow rate $Q_f$ of the oil for the circuit 10 will be considered. The required flow rate $Q_f$ may be expressed by a product between a pressure receiving surface area SA of a piston of the actuator 5 which actively controls the steer angle of the front wheels 1 and a moving speed v of the piston ($Q_f = S_A \times v$). The moving speed v of the piston of the actuator 5 can be expressed by $v = 2\pi \times f \times d$, wherein f is a frequency of the active control signal for the front wheels 1 and d is a stroke of the piston. Then, $Q_f = S_A \times 2\pi \times f \times d$ is obtained In a similar manner, a required flow rate $Q_r$ of the oil for the circuit 11 for actively controlling the steer angle of the rear wheels 2 can be obtained. Since the discharge rate $Q_0$ of the oil pump 7 may be expressed by the following equation: $Q_0 = Q_f + Q_r$, a distribution ratio for obtaining the required flow rates $Q_f$ and $Q_r$ is achieved by setting the diameters of the orifices 12g and 12f in accordance with ratios of $Q_f/Q_0$ and $Q_r/Q_0$, respectively. In this manner, the distributing valve 12 can deliver the oil into the circuits 10 and 11 at the required flow rates $Q_f$ and $Q_r$. Further, when the oil pressure in the circuit 10 or 11 is changed due to the variation of the flow rate, the shuttle spool 12a of the valve 12 is moved rightward or leftward so that the opening 12i or 12h is closed by the inner wall of the housing. In this manner, it is possible to prevent the balance of the flow rate ratio from being disturbed, and thus the pressure variation in one circuit gives no influence upon the other circuit.

The active steer angle control is carried out by controlling the steer angle control valves 14 and 15, while the pressure variation in one circuit does not affect the pressure in the other circuit as explained above.

Each of the steer angle control valves 14 and 15 is constructed by a pressure control valve which is provided between the auxiliary steer angle control circuit 10 and 11 and the actuators 5 and 6, respectively. The valves 14 and 15 are further provided between the actuators 5 and 6 and a common drain circuit 13.

When solenoids 14a and 14b in the control valve 14 are not energized, all the oil supplied from the circuit 10 is fedback into the drain circuit 13 and chambers 5a and 5b of the actuator 5 are kept at a non-pressure state. Then, the actuator 5 is held in a neutral position by means of springs 5c and 5d provided therein, so that the steering gear 4 is driven into a condition in which the steer angle of the front wheels 1 is not actively controlled. When the solenoid 14a is energized, the valve 14 functions to increase the pressure in the chamber 5a and the chamber 5b is drained, so that the actuator 5 is extended. Then, the steering gear 4 is moved rightward in FIG. 2 and the front wheels 1 are auxiliarily steered leftward within said maximum angle $\alpha$. When the solenoid 14b is energized, the chamber 5b is compressed and the chamber 5a is drained, so that the length of the actuator 5 is shortened and the steering gear 4 is moved leftward. Then, the front wheels 1 are steered rightward within the maximum angle $\alpha$. In this manner, the steer angle of the front wheels 1 is actively controlled.

The construction and operation of the rear wheel active control apparatus including the steer angle control valve 12 and actuator 6 for actively controlling the steer angle of the rear wheels 2 are the same as those explained above, so that portions similar to those of the steer angle control valve 14 and actuator 5 are denoted by applying the same suffixes a to d and their detailed explanation is dispensed with.

The solenoids 14a, 14b of the valve 14 and the solenoids 15a, 15b of the valve 15 are on-off controlled by a controller 16, to which are supplied a steering wheel angle signal generated from a steering wheel angle sensor 17 for detecting a steering angle $\theta$ of the steering wheel 3, a running velocity signal produced by a running velocity sensor 18 for detecting a running velocity V of the vehicle, and a signal generated by a stroke sensor 19 for detecting a stroke of the rear wheel actuator 6.

The controller 16 comprises input detecting circuit, calculating circuit, memory circuit for storing a steer angle controlling program which is executed in the calculating circuit, and output circuit for sending control signals to the steer angle controlling valves 14 and 15. The calculating circuit derives the auxiliary steer angle control signals for the front and rear wheels 1 and 2 in accordance with the above mentioned parameters detected by the sensors and the output circuit supplies on-off control signals $I_{Fa}$, $I_{Fb}$, $I_{Ra}$, and $I_{Rb}$ to the solenoids 14a, 14b, 15a, and 15b, respectively of the steer angle controlling valves 14 and 15.

The auxiliary steer angle control amounts $\delta_f$ and $\delta_r$ for the front and rear wheels 1 and 2, respectively, are calculated in accordance with the operating conditions of the steering wheel 3 (steering wheel angle $\theta$ and angular velocity $\theta'$ of the angle $\theta$) and the running velocity V of the vehicle. In the present embodiment, the angular velocity of the steering wheel angle $\theta$, i.e., a first order differential of the steering wheel angle $\theta'$, is utilized as a transient component, and the auxiliary or active steer angle control amounts $\delta_f$ and $\delta_r$ are calculated in the following manner.

$$\delta_f = K_{f(V)} \times \theta + T_{f(V)} \times \theta' \quad (1)$$

$$\delta_r = K_{r(V)} \times \theta + T_{r(V)} \times \theta' \quad (1)$$

Here, $K_{f(V)}$ and $K_{r(V)}$ are coefficients for $\theta$ in the proportional components, said coefficients varying in accordance with the running velocity V of the vehicle, and $T_{f(V)}$ and $T_{r(V)}$ are coefficients for $\theta'$ in the differential components, said coefficients also varying in accordance with the running velocity V of the vehicle.

Each of the above mentioned equations (1) and (2) has the proportional term (first term) and the differential term (second term). That is to say, during the transient period of the steer angle active control ($\theta$ is small, but $\theta'$ is large), a sharp characteristic is obtained by the differential term and during a steadystate period ($\theta$ is large, but $\theta'$ is small), the stability is realized by the proportional term. The equation (2) performs a so-called phase reverse control.

According to the invention, the controller 16 is constructed such that when the steer angle of the front wheels 1 is actively controlled in accordance with the differential of the steering wheel angle, the differential equal to or higher than the first order of the auxiliary steer angle control signal is delayed such that the initial abrupt change and the succeeding oscillatory variation in the steering force for manipulating the steering wheel 3 can be suppressed sufficiently.

That is to say, in the equation (1), the first term represents the proportional component $\delta_{fp}$ of the active steer angle control signal and second term shows the differential component $\delta_{fd}$ thereof which is a first order differential of the steering wheel angle $\theta$, and only the differential component $\delta_{fd}$ is delayed.

When the transient steer angle control signal $\delta_{fd}$ is derived by the first order differential of the steering wheel angle $\theta$, i.e., the steering wheel angular velocity $\theta'$, the delay can be given by producing a differential by deriving a difference between sample values obtained at sampling points which are separated by N sampling period.

FIG. 3 is a flow chart showing an example of a program for giving the delay for the first order differential of the steering wheel angle. This program is executed at a regular time interruption.

In a step 100, the steering wheel angle $\theta$ detected by the sensor 17 is entered. In a next step 110, an angular velocity $\theta'$ of the steering wheel angle is calculated. That is to say, when the operation for entering the steering wheel angle is carried out every 5 ms, the angular velocity of the steering wheel angle can be derived by the following equation:

$$\theta' = \frac{\theta_0 - \theta_N}{5 \times N} \times 1000 \text{ deg/sec} \quad (3)$$

, wherein $\theta_0$ is a steering wheel angle obtained at an instant program cycle and $\theta_N$ is a steering wheel angle entered at a program cycle which precedes the instant cycle by five cycles.

In a next step 120, the front wheel auxiliary steer angle $\delta_f$ is calculated by applying the thus derived angular velocity of the steering wheel angle in the equation (1). And in a step 130, the steer angle controlling process is performed by using the thus calculated front wheel auxiliarily control amount $\delta_f$.

According to the invention, by delaying only the differential component in the active steer angle control amount, it is possible to resemble the steering force characteristic to that of the normal vehicle in which the active control is not carried out.

According to the invention, the reason for delaying only the differential component of the active steer angle control amount is that the proportional component has a less influence upon the variation of the steering force than the differential component.

According to the invention, by delaying the differential component of the active steer angle control amount, the steering force characteristic can be resembled to that without the active control. This may be explained hereinbelow.

Figure 4B:
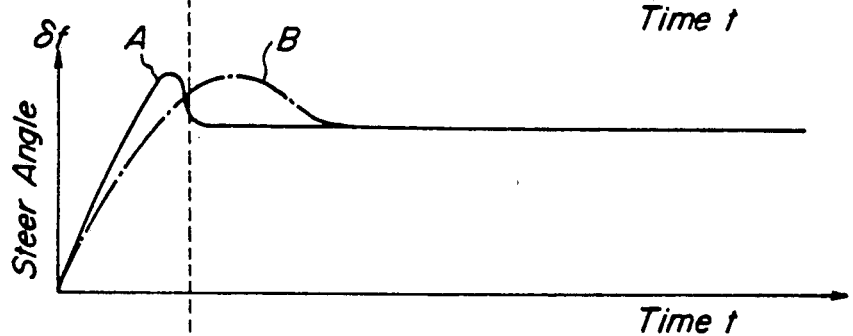
Figure 4C:
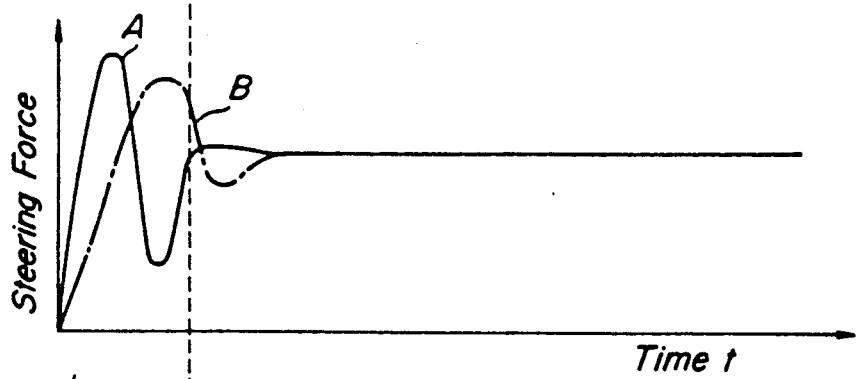
Figure 4D:
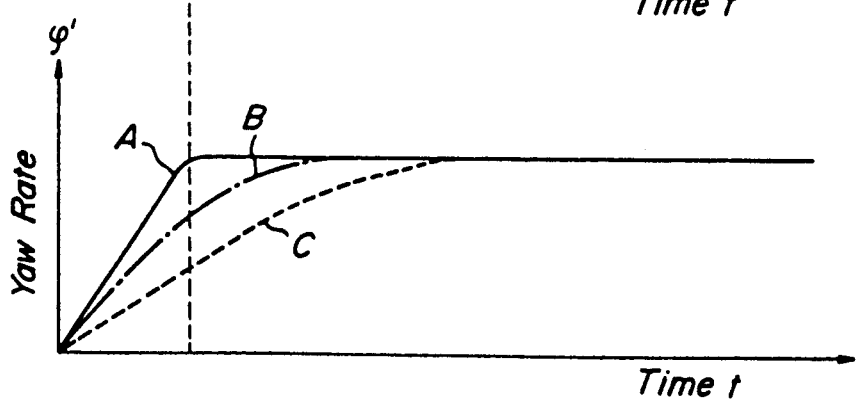

FIG. 4A shows the variation of the steering wheel angle, FIG. 4B the variation of the auxiliary steer angle of the front wheels, FIG. 4C the variation of the steering force, and FIG. 4D represents the variation of the yaw rate. In FIGS. 4B to 4D, the variations in case of the known active control apparatus are also shown.

In a normal vehicle in which the active control is not performed, the steer angle of the front wheels is changed in proportion to the steering wheel angle, and this generates a slip angle which then produces self-aligning torque and cornering force. Due to plays in the column system and steering system, the steer angle is delayed with respect to the steering wheel angle. Therefore, in the normal vehicle, a phase difference between the steer angle and the steering force becomes within a certain range, and there is not produced an initial abrupt change in the steering force.

In the vehicle adopting the active control of the steer angle, the steer angle of the front wheels is increased in accordance with the steering wheel angle, so that the head-turning characteristic is improved. On the other hand, a delay between the steering wheel angle and the steer angle is hardly produced. Particularly, the active control amount includes the differential component or transient component $\delta_{fd}$, when the steering wheel is manipulated at a high speed, the front wheels generate a relatively large slip angle and thus the steering force is increased abruptly as illustrated curves A in FIGS. 4B and 4C.

When the differential component is delayed, it is possible to decrease the above mentioned initial abrupt change and the large decrease succeeding thereto can be suppressed and the steering force characteristic can be resembled to that of the normal vehicle without the active control for the steer angle as depicted by curves B in FIG. 4C.

As shown by a curve B in FIG. 4D, the response of the yaw rate is somewhat made dull by delaying the differential component according to the invention as compared with the known apparatus without delay (curve A), but it is superior to that of the normal 2 WS vehicle without the active control (curve C). That is to say, the property for directing the head into a desired direction can be improved by increasing the yaw rate, while the large variation of the steering force can be suppressed. In this manner, according to the invention, the merits of the active control can be substantially attained and the demerit of the know active control apparatus can be removed.

In the above explained embodiment, the transient component of the active steer angle control amount is delayed by deriving a difference between sample values of the steering wheel angle detected at sampling timings which are separated by five sampling periods. When this delaying method is used, it is possible to improve the resolution of the differential when use is made of the steering wheel angle sensor of the pulse system. That is to say, when the steering wheel angle is detected by the pulse type sensor, the resolution of the differential can be increased by delaying the differential in the above explained manner.

In the above embodiment, the transient component $\delta_{fd}$ of the steer angle active control amount is formed by the first order differential of the steering wheel angle $\theta$, but according to the invention, it is possible to form the transient component by a linear sum of high order differentials generally expressed by the following equation, wherein $T_{f1}$, $T_{f2}$, $T_{f3}$ are coefficients:

$$\delta_{fd} T_{f1}\theta' + T_{f2}\theta'' + T_{f3}\theta''' + \cdots$$

Then, one or more higher order differentials may be delayed in addition to the first order differential.

According to the invention, the delay of the differential component of the active steer angle control amount can be realized by various methods. For instance, the differential component may be delayed by a digital filter.

In case of using the digital filter, the active control amount $\delta_f$ of the steer angle of the front wheels may be expressed by $\delta_f = (K_f + T\ f\ s) \times \theta$, wherein s is a Laplace operator. When the active control amount is passed through a digital filter, it can be represented by the following Laplace transforming equation:

$$\delta_f = \left( \frac{T_{fs} W_n^2}{s^2 + 2\zeta W_n s + W_n^2} + K_f \right) \theta \quad (4)$$

wherein $\zeta$ and $W_n$ are constants.

The signal delay by using the digital filter has been well known in the art of the automatic control and the first term represents the delaying transfer function expressing the transient characteristic. $\zeta$ and $W_n$ denote a damping coefficient and the specific frequency of the delaying element, respectively, and $T_f$ represents the gain constant. In case of delaying the transient component by means of the digital filter, various characteristics of the digital filter such as the specific frequency are suitably designed to obtain the desired properties.

As explained above in detail, according to the invention, by delaying the differential component of the active control amount of the steer angle of the front wheels, it is possible to suppress the initial abrupt increase and the succeeding large oscillatory variation in the steering force, so that the maneuverability and handling properties can be improved.

I claim:

1. An apparatus for controlling a steer angle of front wheels of a vehicle comprising:

sensing means for detecting a steering wheel angle to derive a steering wheel angle signal;

signal processing means for processing said steering wheel angle signal to derive an active control signal including at least a first order differential of said steering wheel angle signal, said first order differential being delayed by a delay time such that a variation of a steering force can be suppressed; and actuating means for steering the front wheels in accordance with said steering wheel angle signal as well as said active control signal wherein said signal processing means is constructed such that said delayed first order differential is obtained by sampling said steering wheel angle signal at a predetermined sampling period to derive sample values, and by deriving a difference between sample values obtained at different sampling timings which are separated by N times of the sampling period, wherein N is an integer larger than 1.

2. An apparatus according to claim 1, wherein said signal processing means is constructed such that it produces the active control signal including a proportional term which is proportional to the steering wheel angle and said delayed first order differential term which is proportional to an angular velocity of the steering wheel angle.

3. An apparatus according to claim 1, wherein said signal processing means comprises a circuit for deriving said active control signal including a proportional component and a differential component and a digital filter for delaying only the differential component in said active control signal.

4. An apparatus according to claim 1, wherein said actuating means comprises a steering gear for steering the front wheels in accordance with the steering wheel angle, an actuator coupled to said steering gear such that when the actuator is driven, said steering gear is moved to steer the front wheels, and a controller for controlling said actuator in accordance with said active control signal.

5. An apparatus according to claim 1, further comprising a second signal processing means for processing said steering wheel angle signal to derive a second active control signal for rear wheels including at least said delayed first order differential of said steering wheel angle signal, and a second actuating means for steering the rear wheels in accordance with said second active control signal.

* * * * *